United States Patent
Arthan

(10) Patent No.: US 6,754,349 B1
(45) Date of Patent: Jun. 22, 2004

(54) CRYPTOGRAPHIC KEY, OR OTHER SECRET MATERIAL, RECOVERY

(75) Inventor: Robin Denis Arthan, Twyford (GB)

(73) Assignee: Fujitsu Services Limited, Slough (GB)

( * ) Notice: Subject to any disclaimer, the term of this patent is extended or adjusted under 35 U.S.C. 154(b) by 831 days.

(21) Appl. No.: 09/585,667

(22) Filed: Jun. 1, 2000

(30) Foreign Application Priority Data

Jun. 11, 1999 (GB) ............................................ 9913492

(51) Int. Cl.$^7$ ............................................. H04L 9/08
(52) U.S. Cl. ...................... 380/286; 380/280; 380/277; 380/268; 713/200; 713/201; 713/202; 713/171; 713/165; 705/57
(58) Field of Search ................................. 370/280, 286, 370/277, 268; 713/200–202, 171, 165; 705/57

(56) References Cited

U.S. PATENT DOCUMENTS

| | | | |
|---|---|---|---|
| 5,768,373 A | 6/1998 | Lohstroh et al. ............... | 380/4 |
| 5,991,407 A | * 11/1999 | Murto ......................... | 380/248 |
| 6,160,891 A | * 12/2000 | Al-Salqan .................... | 380/286 |
| 6,185,308 B1 | * 2/2001 | Ando et al. .................. | 380/286 |
| 6,272,225 B1 | * 8/2001 | Miyauchi et al. ............. | 380/286 |
| 6,396,929 B1 | * 5/2002 | Chandersekaran et al. .. | 380/286 |
| 6,442,690 B1 | * 8/2002 | Howard et al. ............. | 713/175 |
| 6,483,920 B2 | * 11/2002 | Pinkas ........................ | 380/286 |
| 6,535,607 B1 | * 3/2003 | Chandersekaran et al. .. | 380/286 |
| 6,549,626 B1 | * 4/2003 | Al-Salqan .................... | 380/286 |
| 6,687,823 B1 | * 2/2004 | Al-Salqan et al. .......... | 713/167 |

FOREIGN PATENT DOCUMENTS

| | | | | |
|---|---|---|---|---|
| EP | 0 891 053 | | 1/1999 | |
| EP | 0 912 011 | | 4/1999 | |
| EP | 0889617 | * | 7/1999 | ............. H04L/9/08 |
| EP | 1050790 A2 | * | 8/2000 | ............. G06F/1/00 |
| EP | 1050993 | * | 8/2000 | ............. H04L/9/32 |
| EP | 1059761 | * | 12/2000 | ............. H04L/9/08 |
| WO | WO 99/25086 | * | 5/1999 | |

OTHER PUBLICATIONS

Bruce Schneier, "Applied Cryptography, Protocols, Algorithms, and Source Code in C", 2rd Edition, pp. 169–187.*
Al–Salqan, Yahya Y., "Cryptographic Key Recovery", IEEE, 1997, pp. 34–37.*
Lee et al., "On the Key Recovery of the Key Escrow System", IEEE, 1997, pp. 216–220.*

* cited by examiner

Primary Examiner—Matthew Smithers
Assistant Examiner—Tongoc Tran
(74) Attorney, Agent, or Firm—Barnes & Thornburg LLP

(57) ABSTRACT

Secret material, such as a cryptographic key, that is needed for operation of a computer system (4a), can be stored under password protection on a storage medium for insertion into the computer system as required. If the password is forgotten, or the storage medium is faulty, the secret material will not be accessible. To permit secure recovery of the secret material in these or other circumstances, the secret material is encrypted using a recovery key and stored on the computer system, together with a value used in the generation of the recovery key from the secret material. The secret material is also stored on a remote secure system (5). When recovery of the secret material is required, the value for generating the recovery key is supplied to the remote system and used to generate the recovery key there. The generated recovery key is then supplied to the computer system, where it is used to decrypt the secret material. A new recovery key is then generated using a different value for a future recovery instance. The value can be supplied to the remote system (5) by dictation of a corresponding alphanumeric expression by a computer system operator (6), over a telephone connection (7, 8, 9) to a support technician (10) at the remote system for input thereat, and another alphanumeric expression corresponding to the generated recovery key can be dictated back to the computer system operator for insertion into the computer system and subsequent decryption of the secret material, thus allowing operation of the computer system, in circumstances where there is no data connection link between the two systems.

6 Claims, 2 Drawing Sheets

CRYPTOGRAPHIC KEY, OR OTHER SECRET MATERIAL, RECOVERY

BACKGROUND OF THE INVENTION

This invention relates to cryptographic key, or other secret material, recovery and, in particular, to a mechanism which permits key or other secret material to be recovered securely even when electronic data communication links between two parties, one requiring and the other capable of providing the material, are not available.

SUMMARY OF THE INVENTION

According to the present invention there is provided a method permitting secure storage and secure recovery of secret information at a first location, comprising the steps of generating a recovery key from the secret information using a recovery key generation value, encrypting the secret information using the recovery key, storing the recovery key generation value and the encrypted secret information at the first location, and storing the secret information at a second location, and wherein when recovery of the secret information is required at the first location performing the steps of supplying the recovery key generation value from the first location to the second location, generating the recovery key from the secret information stored at the second location using the supplied recovery key generation value, supplying the recovery key generated at the second location to the first location, and, at the first location, decrypting the encrypted secret information using the supplied recovery key.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
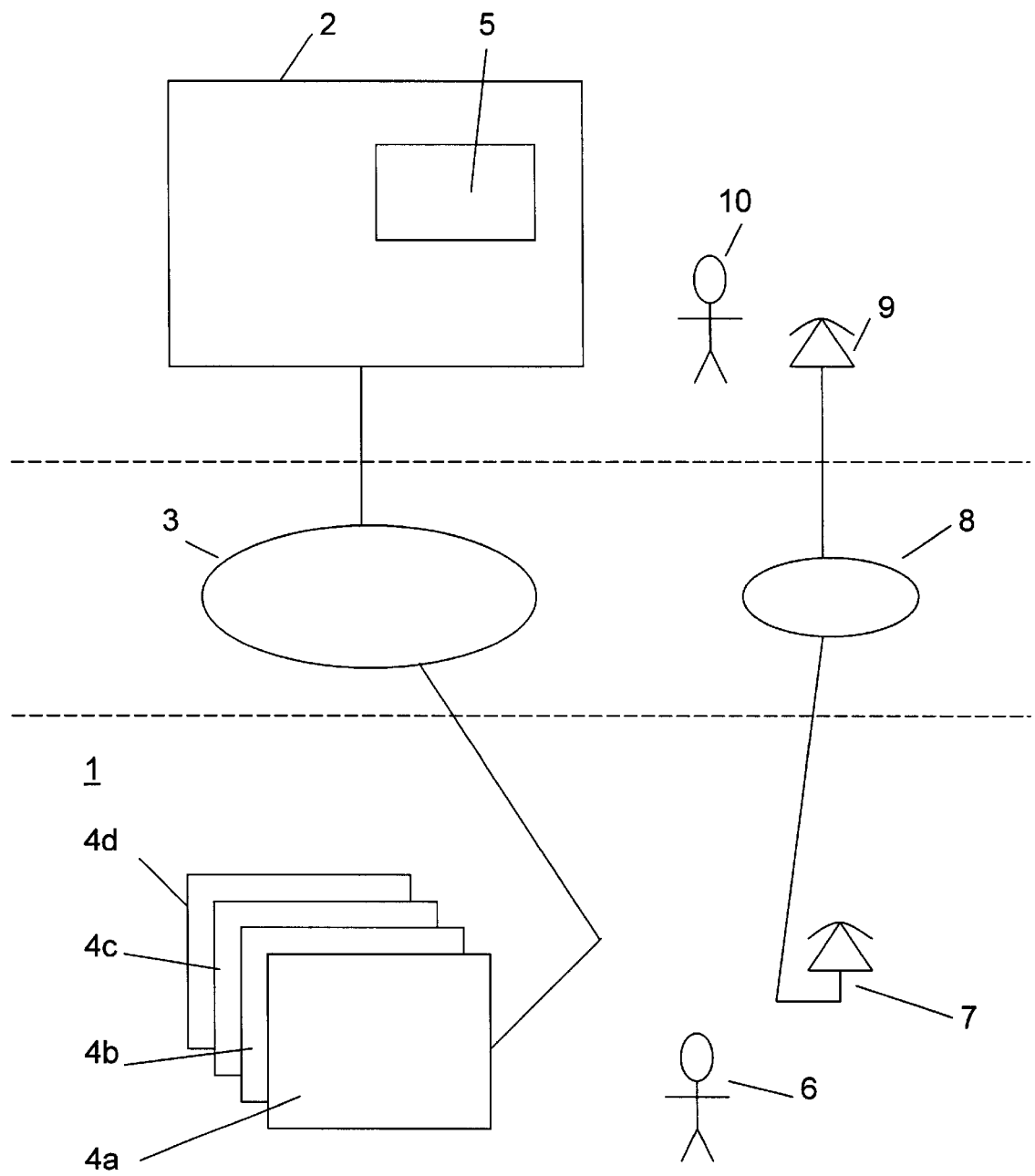
FIG. 1 illustrates schematically a computer system with a first (client) site and a remote (central) site, which may be connected via optional data communication links, and telephonic communication between operators at the two sites is possible.

Referring firstly to FIG. 1, the invention is applicable to a computer system comprising a large number of client sites, only one of which is shown in the drawing, where physical security may not be strong. The client sites, such as 1, can communicate business data with a system comprising a plurality of central servers, indicated schematically, as central system 2, via optional data communications links, indicated schematically as network 3, which may offer less than 100% availability. The overall system is, however, required to protect data held on computers at the client sites that are liable to theft or to accidental misuse by human operators, who may know very little about IT systems.

Cryptographic techniques, such as public key encryption, can be used to protect the privacy and/or integrity of data stored at the client sites 1, which as illustrated includes four personal computers 4a, 4b, 4c, 4d, as well as in transit such as over network 3. In this case, each client site will require both public and private keys to provide the cryptographic protection. Typically, the security policy for the overall system may be such as to require these keys to be changed both periodically and when the value of a private key is believed to have been compromised.

To facilitate management of the cryptographic keys, a central key management server 5 is included in central system 2. The key management server 5 is responsible for coordinating the generation and distribution of cryptographic keys. Business needs may dictate that a rapid recovery following loss of key material should be possible, even when the communications links 3 between the client site 1 and the central system 2 are too slow or have broken down. For this purpose, one of the computers of each client site, that is one of the four personal computers, for example 4a, is nominated as a "recovery" computer and serves to manage recovery of any lost key material.

At each client site, a local human operator 6 is designated as responsible for managing confidential cryptographic key material that is known only on that site and at the central key management server 5. This confidential key material may be held at the client site under password protection on a removable rewriteable storage device, such as a memory card or floppy disk, and introduced on an "as needed" basis to a client site computer.

Faults in the removable storage device or operator error, such as losing the password, prevent the client site from carrying out normal business. Whilst the key management server 5 might be able to help the client site recover from such situations by sending it private cryptographic key material via the communications links 3, if the latter are unavailable when key recovery is required this will not be possible, and an alternative mechanism for secure recovery of the necessary key material is desirable.

The mechanism proposed by the present invention involves a recovery algorithm which requires the following cryptographic facilities to be available:

1. A symmetric encryption algorithm.
   ENCRYPT (P, K) denotes the result of encrypting plain text data P under key K using this algorithm.
   DECRYPT (C, K) denotes the result of decrypting cipher text data C under key K.
2. A secure hash function.
   HASH ($D_1$, $D_2$, . . . ) denotes the result of applying this function to the data items $D_1$, $D_2$, . . . The hash function is expected to return a result suitable for use as a key for the symmetric encryption algorithm.
3. A random number generator.
   RANDOM ( ) denotes the result of calling this random number generator.

For example, ENCRYPT might be an implementation of the DES (Digital Encryption Standard) or IDEA (International Data Encryption Algorithm) algorithms; HASH might be derived from an implementation of the MD5 or SHA (Secure Hash Algorithm) algorithms. The random number can, for example, be a 64-bit random number.

A number of preliminary computations are necessary, in order to enable key recovery to be achieved when required. Denoting the private cryptographic key material (or secret) to be protected as PRKEYS, whenever a new value of PRKEYS is supplied by Key Management Server 5 at a remote site to a client site, PRKEYS is stored under password protection on the removable storage medium (device), and at the same time the recovery computer 4a generates a random seed value RSEED,

RSEED=RANDOM ( )

The recovery computer 4a then computes a recovery key encryption key, RKEK, as follows:

RKEK=HASH (PRKEYS, RSEED)

The following two values are then stored in fixed storage inside the recovery computer, using the symmetric encryption algorithm ENCRYPT referred to above to generate the second value;

RSEED, ENCRYPT (PRKEYS, RKEK)

Care must be taken to ensure that the following conditions hold:

1. The value of RKEK is securely erased from all storage in the recovery computer.
2. Previous values of RSEED and ENCRYPT (PRKEYS, RKEK) are overwritten by the newly computed ones.

When an occasion occurs requiring use of the private key information but which information is unavailable due to loss of the password for the storage device, or a fault in the removable storage device, the local operator 6 can achieve recovery of the private key via a voice (telephone) connection (7, 8, 9) to a support technician 10 with computer access to the central server system 2. The local operator will need to supply some form of authentication that the support technician can validate, but exactly what this involves is not part of the present invention. Suffice it to say that this may comprise the provision of one or more pre-defined pass phrases, and will serve to prevent an attacker using the support service to acquire key material relating to a stolen computer.

The support technician 10, once satisfied of the authenticity of the local operator 6, then invites the local operator to select a recovery option at the recovery computer 4a. The recovery computer 4a then displays a human readable encoding of the stored value RSEED, for example as 15 alphanumeric characters, which the local operator 6 can dictate to the support technician 10, who in turn supplies it to the central key management server 5, which can then calculate RKEK from

RKEK=HASH (PRKEYS, RSEED)

The calculated value of RKEK is transmitted back to the support technician 10, for example again as 15 alphanumeric characters, who dictates it to the local operator 6 for typing into the recovery computer 4a. The recovery computer can now use it with the stored value ENCRYPT (PRKEYS, RKEK) to recover the value of PRKEYS as follows:

PRKEYS=DECRYPT (ENCRYPT (PRKEYS, RKEK), RKEK)

The recovery computer 4a then carries out the following actions:

1. Refresh the removable storage device (possibly a spare if the original was faulty).
2. Repeat the preliminary computations (generation of RSEED, computation of RKEK, and storage of RSEED, ENCRYPT (PRKEYS, RKEK)).
3. Proceed with normal business using the recovered values of PRKEYS.

Step 2, ensures that the now compromised value of RKEK does not pose a security threat.

The above procedure can be applied both as a fallback in cases where fully automatic recovery via electronic communications is not possible or to speed up recovery in cases where keys are normally delivered by slow manual (non-electronic) routes. The latter is particularly relevant to client sites which never have a communications connection to a central system 5, rather they operate independently of such a central system but employ securely protected portable memory devices to ensure confidential material is not readily available from computers stolen from such sites, for example. In this case the key material will be delivered on a respective storage device to the client site by a secure physical route and replacement by another device will take some considerable time in comparison with the recovery telephone call approach.

Figure 2:
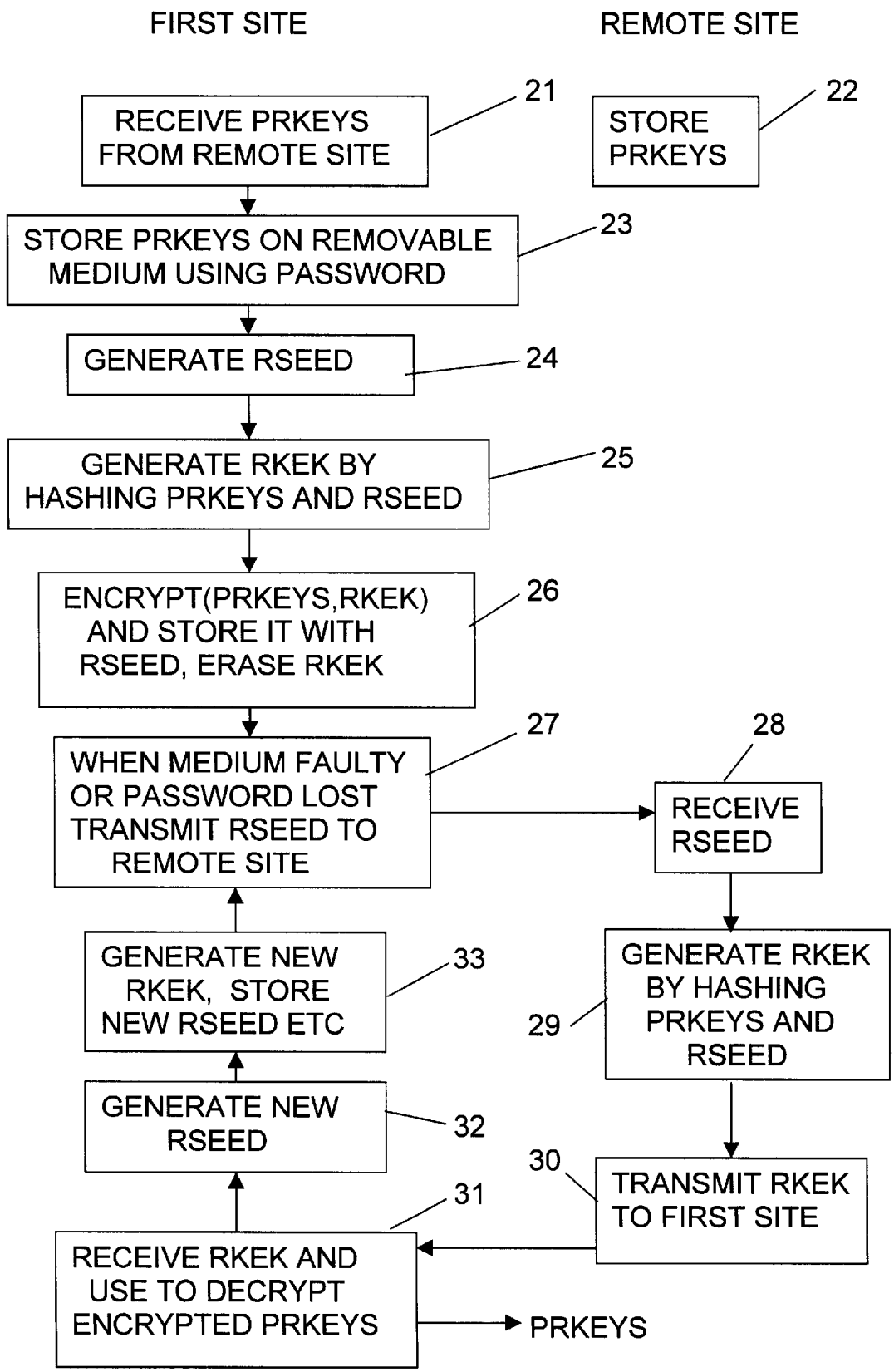
FIG. 2 illustrates schematically the steps taken in an embodiment of the recovery method of the present invention.

In more general terms, the invention provides a recovery process whereby key or other secret material, loaded under password protection onto a removable storage medium which is to be inserted into the first site computer when required, is obtainable even if the password is forgotten or the storage medium is faulty. The key or other secret material is in fact stored in an encrypted form on the first site computer, but it is only obtainable therefrom with the assistance of another (remote) site. Specifically, the key or other secret material is required to be known (stored) at the remote site, in a secure manner. The key or other secret material may actually have been generated at the remote site and supplied to the first site computer therefrom. This is the scenario illustrated in FIG. 2, step 21 indicating reception of PRKEYS at the first site from the remote site, and step 22 indicating storage of PRKEYS at the remote site.

When the key material under password protection is loaded onto the storage medium (step 23), a random value is generated at the first site computer (4a) (step 24) and used to compute a recovery key RKEK from key material, such as by hashing the key material with the random value (step 25). The random value, and the key material as encrypted by the recovery key, are stored on the first site computer and steps are taken, including erasing RKEK, to ensure that the key material and the recovery key per se are not stored on the first site computer (step 26). If the password is forgotten or the storage medium proves to be faulty, the first site computer will be unusable since the recovery key, required for decryption purposes, will not be available to it directly. However, if an operator of the first site computer, suitably authenticated, supplies the random value to the remote site (step 27), the latter on receipt (step 28) can then calculate the recovery key from the key material by hashing PRKEYS and RSEED (step 29) and can supply the recovery key to the operator of the first site (step 30). This can be achieved, without the need for a secure connection, such as by a telephone call from the operator to a support technician at the remote site, the dictation of the operator of a value corresponding to the random value and comprising, for example, 15 alphanumeric characters and dictation by the support technician of a value corresponding to the resultant calculated recovery key to the operator.

When the calculated recovery key is received at the first site computer, it is used to decrypt the encrypted key material and commence normal operation with the extracted PRKEYS (step 31). The recovery key is immediately replaced by a new one by generating a new RSEED, hashing it with PRKEYS to produce a new recovery key RKEK, encrypting the key material with the new recovery key, and storing it with the new RSEED (step 33), which is equivalent to original steps 25 and 26.

It should be noted that the support technician never learns the key material, and that the recovery key is in effect a one-time password. The recovery key can only be regenerated if there is knowledge of both the key material and the random value. Initially the first site knows the random value but has an encrypted version of the key material, and the other (remote) site only knows the key material, but upon knowledge of the random value the other site can generate a recovery key value which it can send to the first site, and which enables the first site to decrypt the encrypted key material. As will be apparent from the above, both sites also need knowledge of the secure hash function to be employed, since they both have to be able to generate RKEK by hashing PRKEYS and RSEED.

I claim:

1. A method permitting secure recovery of secret information which is stored at a first location and is also stored at a second location, remote from said first location, said method comprising the steps of:

(a) generating a seed value at the first location, (b) using said seed value to generate an encryption key from the secret information at said first location, (c) using said encryption key to encrypt the secret information at said first location, (d) storing the seed value and the encrypted secret information at the first location, (e) securely erasing said encryption key from said first location, (f) when recovery of the secret information is required at the first location, supplying the seed value from the first location to the second location, g) at said second location, using said seed value to generate a recovery key from the secret information stored at the second location, (h) supplying the recovery key from the second location to the first location, and, (j) at the first location, decrypting the encrypted secret information using the recovery key.

2. A method as claimed in claim 1, and wherein following decryption of the encrypted secret information by the recovery key, including the steps of generating a new encryption key from the secret information using a new seed value, encrypting the secret information using the new encryption key, and storing the new seed value and the newly encrypted secret information at the first location instead of the previous versions thereof.

3. A method as claimed in claim 1 and wherein the seed value is a random number generated at the first location, and wherein said encryption key is generated by applying a secure hash function to the random number and the secret information.

4. A method as claimed in claim 1, wherein the secret information is encrypted with a symmetric encryption algorithm using said encryption key as the key thereof.

5. A method as claimed in claim 1 wherein the first location comprises a computer system at a client site and the second location comprises a remote central site, wherein the secret material is a cryptographic key needed for operation of the client site, wherein the cryptographic key is stored under password protection on a storage medium for insertion into the computer system as required, and wherein the method of secure recovery of the cryptographic key is employed in the event of lose of the password or a fault in the storage medium.

6. A method as claimed in claim 5, wherein the step of supplying the seed value from the first location to the second location comprises dictation, over a telephone connection, of a corresponding expression by an operator of the computer system to a support technician at the central site for input thereto, and the step of supplying the recovery key generated at the central site to the computer system comprises the dictation, over the telephone connection, of a respective corresponding expression by the support technician to the operator.

* * * * *